United States Patent [19]
MacDonald et al.

[11] Patent Number: 5,390,197
[45] Date of Patent: Feb. 14, 1995

[54] VESTIGIAL IDENTIFICATION FOR CO-CHANNEL INTERFERENCE IN CELLULAR COMMUNICATIONS

[75] Inventors: Andrew J. MacDonald, Damascus; Youngky Kim, N. Potomac; Stanley E. Kay, Rockville, all of Md.

[73] Assignee: Hughes Aircraft Company, Los Angeles, Calif.

[21] Appl. No.: 985,767

[22] Filed: Dec. 4, 1992

[51] Int. Cl.6 .............................. G06F 11/10
[52] U.S. Cl. .................. 371/37.1; 371/37.7; 371/53
[58] Field of Search ............. 455/33.3, 33.4; 370/110.1; 371/37.1, 53

[56] References Cited
U.S. PATENT DOCUMENTS

| | | | |
|---|---|---|---|
| 4,517,669 | 5/1985 | Freeburg | 370/82 |
| 4,519,068 | 5/1985 | Krebs | 370/82 |

*Primary Examiner*—Paul P. Gordon
*Assistant Examiner*—Emmanuel L. Moise
*Attorney, Agent, or Firm*—Gordon R. Lindeen, III; Wanda K. Denson-Low

[57] ABSTRACT

A vestigial identification system is provided for transmitting information in a cellular communications network employing frequency reuse. The vestigial identification system enables a receiver to detect both bit errors and interfering messages to avoid call disruption. A composite parity check is produced by encoding message data and a site identifier via an encoder. A transmitter conveys a code word, formed at a code word generator by combining the composite parity check with the message data, to a receiver. At the receiver, an encoder forms an error detection parity check by encoding both the message data from the code word and the site identifier. An error detector compares the composite parity check from the transmitted code word to the error detection parity check, and generates an error if the parity checks are not identical to one another, enabling rejection of the message by the receiver.

16 Claims, 3 Drawing Sheets

VESTIGIAL IDENTIFICATION FOR CO-CHANNEL INTERFERENCE IN CELLULAR COMMUNICATIONS

BACKGROUND OF THE INVENTION

1. Field of the Invention

The present invention relates to cellular communications systems and, more particularly, to a vestigial identification system and method for more efficiently transmitting information in cellular communications systems employing channel reuse.

2. Description of Related Art

A cellular communications system is a mobile wireless telephone service in which radio coverage is divided into a network of cells, and each cell is assigned a number of available radio frequencies. In a standard cellular communications system, a base station transceiver system transmits and receives control and voice communication data from a base station controller within the same cell, and transfers the data to selected mobile users within the cell via a radio interface, such as the E-TDMA ™ radio interface of Hughes Network Systems, Inc.

The base station controller in such a system is controlled by a mobile switching center which provides an interface to a public switched telephone network interface, and which provides mobility control across the cellular system. The mobile switching center controls the transfer of information to selected base station controllers within the cellular system according to the position of the mobile user to whom the information is directed, providing a roaming and hand-off function between cells.

In cellular communications systems, encoding/decoding procedures are applied to transmitted voice and other data to detect data errors. If errors should go undetected, message transmission may be disrupted. One cellular system error detection procedure involves the encoding of a message using a cyclic redundancy code (CRC).

According to the CRC error detection process, information bits representing information to be transmitted are encoded by a CRC encoder to produce CRC code words. As shown in FIG. 7, each code word 70 consists of an 'I' field 72 containing $L_i$ information bits, representing the data to be transmitted, and a 'P' field 74 comprising $L_p$ parity check bits. For each possible combination of information bits $L_i$, a parity check containing p parity bits is generated. Each code word 70 is formed by combining the information bits 72 and associated parity bits 74. The collection of all such code words is called the code book. To enable error detection at the receiving end, the 'P' field 74, containing the CRC parity bits $L_p$, is transmitted with the 'I' field 72 information bits $L_i$.

The entire code word 70, including the information field 72 and the parity check field 74, is transmitted through the noisy channel to a receiver. The receiver then produces an information field I' and a parity check field P', approximating the transmitted code word 70. The information field I' is subsequently CRC encoded to generate a parity check P''. If P'' is identical to P', the message is accepted by the receiver. This implies that the information field I' and the parity check field P' form a code word that can be found in the code book.

The performance of a CRC can be examined with respect to its distance properties. For an (n, k) CRC, "n" refers to the total length ($L_i+L_p$) of the code word, and "k" refers to the length of the information portion $L_i$. Thus, the code book contains $2^{L_i}$, or $2^k$, entries, and the comparison of P'' to P' is equivalent to looking in the code book for an entry corresponding to I'+P'. The CRC is further characterized by a minimum distance $D_{min}$, representing the minimum distance between any two code words in the code book. Specifically, the minimum distance refers to the number of bits which differ between any two code words. For instance, a minimum distance $D_{min}=7$ means that there must be at least seven errors in the received message (I'+P') for the CRC to fail to detect an error. This is true because the received message (I'+P') must form another code word in the code book to be accepted.

In a cellular communication system employing channel reuse, in which data is transmitted to different cellular users via the same channels, the ability of a receiver to distinguish between a message from the appropriate transmitter and a message from an interfering transmitter using the same channel is important. Acceptance of control messages from interfering cells can cause calls to be dropped. To enable the receiver to identify the correct message in a system using channel reuse, an identifier indicating the source of the interfering transmission is generally transmitted with the message.

In some systems in which message identification and error detection are provided, an identifier field 32 and a parity check field 36 have been included with data 34 as part of the transmitted message, as shown in FIG. 3. The parity check 36 is used to detect errors in both the data field 34 and identifier field 32 of the message, but the identifier itself is also transmitted to enable the receiver to determine the origin of the received transmission. If either the identifier is incorrect or the parity check flags a bit error in the data or the identifier, the message is disregarded.

For cellular networks having high traffic densities, it would be desirable to increase the data bearing capacity of each transmission by eliminating the transmission of the identifier while continuing to provide detection of interfering messages. For example, it is not necessary that the receiver identify which interfering transmitter sent the message. Because it is only necessary that the receiver determine whether the message was transmitted from an interferer, the transmission of identifier data indicating the source of the interfering transmission may not be required.

SUMMARY OF THE INVENTION

One object of the present invention is to provide a system enabling efficient transmission of information in a cellular communications network employing frequency reuse.

Another object of the present invention is to provide a method of efficiently transmitting information in a cellular communications network employing frequency reuse.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the present invention is a vestigial identification system for transmitting information in a cellular communications network employing frequency reuse. The vestigial identification system comprises means for generating a message including a plurality of information bits, means for generating an identifier including a plurality of identification bits indicating a source of the message, means for encoding the message and the identifier to generate a composite parity check including a plurality of parity bits, means for combining the message and the parity check to form a code word, and means for transmitting the code word, wherein the plurality of identification bits identify the transmitting means.

In another aspect, the present invention is a vestigial identification method for transmitting information in a cellular communications network employing frequency reuse. The vestigial identification method comprises the steps of generating a message including a plurality of information bits, generating an identifier including a plurality of identification bits indicating a source of the message, encoding the message and the identifier to generate a composite parity check including a plurality of parity bits, combining the message and the parity check to form a code word, and transmitting the code word, wherein the plurality of identification bits identify the source of the transmission.

It is to be understood that both the foregoing general description and the following detailed description are exemplary and explanatory only and are not restrictive of the invention, as claimed.

The accompanying drawings, which are incorporated in and constitute a part of this specification, illustrate various embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

A cellular communications system to which the vestigial identification encoding technique of the present invention is particularly applicable is a digital cellular system employing frequency reuse to achieve large voice traffic carrying densities over the geographical service area. An example of one cellular communications system is the digital cellular network disclosed in U.S. patent application Ser. No. 07/622,232, filed Dec. 6, 1990, now U.S. Pat. No. 5,299,198 issued on Mar. 29, 1994, the subject matter of which is hereby incorporated by reference.

Figure 1:
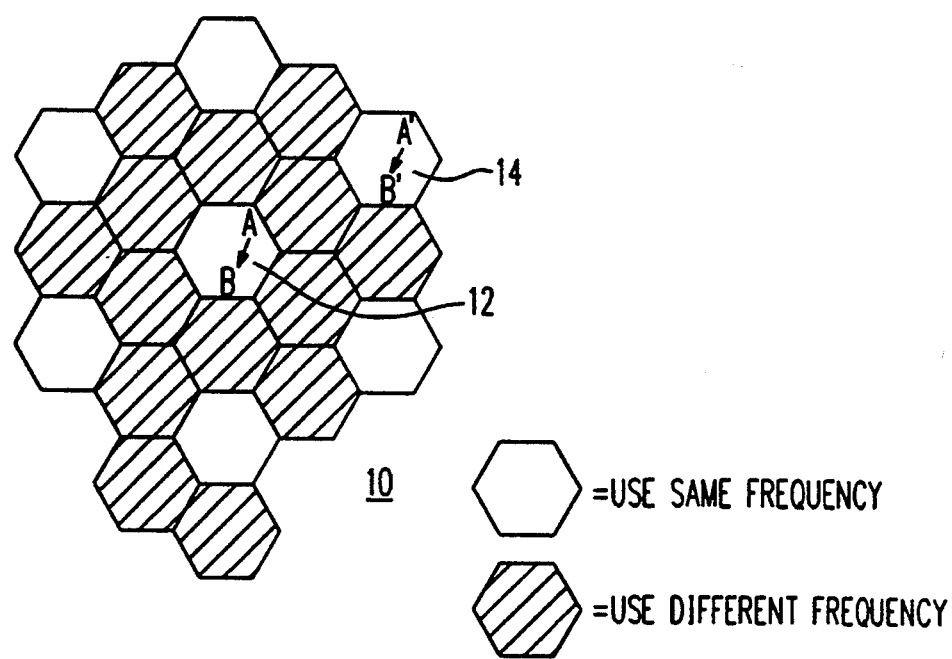
FIG. 1 is a context diagram illustrating a network of cells constituting a service area in a cellular communications system.

As shown in FIG. 1, a cellular system 10 consists of multiple cells defining the service area. To increase traffic carrying densities, the same frequencies are used for transmission in selected cells so that a message sent to a user in one cell and a message sent to another user in a different cell can be transmitted over the same channels. For example, a channel used to communicate between A and B in cell 12 can be reused by A' to communicate with B' in cell 14.

Cells assigned the same frequency channels are selected on the basis of minimum distance requirements, defined by signal propagation characteristics, to limit co-channel interference. However, even in a system designed according to such distance requirements, it is possible that a user receiving messages over a given channel in one cell may receive a message transmitted over the same channel by a transmitter in another cell. This co-channel message is characterized as an interferer. If the user receives such a message, effective communication may be disrupted.

Figure 2:
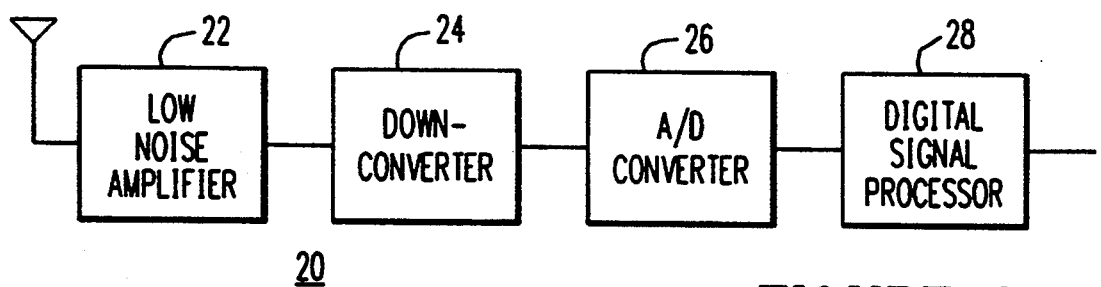
FIG. 2 is a schematic block diagram illustrating receiving apparatus in a cellular communications system in accordance with the present invention.

In a digital cellular system incorporating the present invention, each message sent from A to B, for example, is digitally encoded and transmitted in the UHF band to a receiver such as that illustrated in FIG. 2. In the preferred digital cellular system, the message signal transmitted to the receiver 20 is amplified by a low noise amplifier 22 and demodulated in a down-converting section 24. A/D conversion section 26 then converts the demodulated signal to digital format for analysis by a digital signal processor 28.

Figure 3:
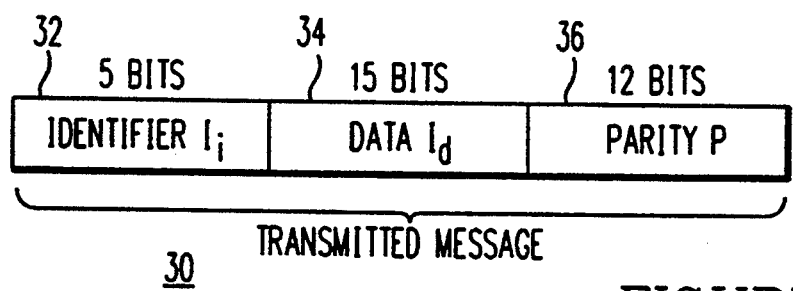
FIG. 3 is an example of one technique for providing identification in a cellular communications system, in which the transmitted message incorporates an identifier, a data field, and a parity field.

Due to propagation characteristics, the signal transmitted by A' may be received by B. In this case, the signal from A' must be rejected to avoid a potential disruption in the present call. Rejection of the signal from A' requires that the interfering signal be discarded, but not necessarily that the interfering source be identified. Although identification of the interfering source may not be necessary, some systems include a separate source identifier 32 with the data field 34 and parity field 36 in the transmitted message 30, as shown in FIG. 3. In such a system, a message is rejected if it includes the wrong source identifier. Thus, this approach to message identification and error detection requires the transmission of both a parity field and an identifier field, which may be unnecessary.

Figure 4:
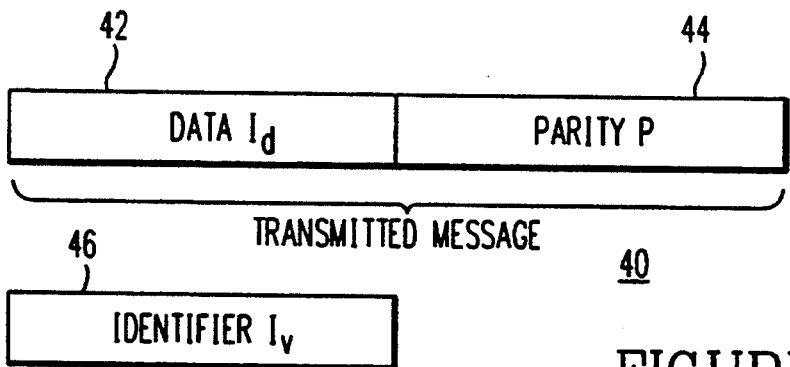
FIG. 4 is an example of a message transmitted according to the vestigial identification encoding scheme of the present invention.
Figure 7:
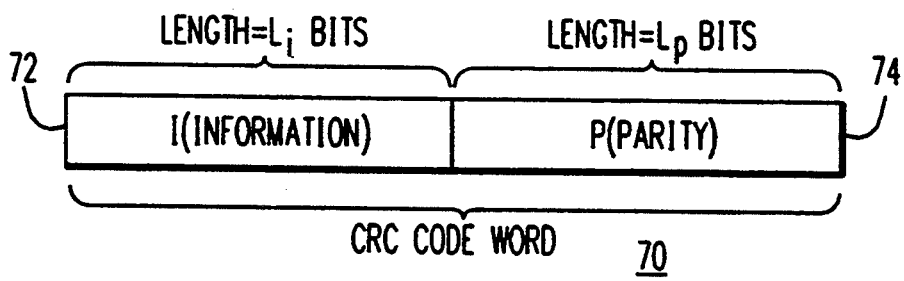
FIG. 7 is a diagram of a general CRC code word including an information field and a parity check field.

The vestigial identification encoding technique of the present invention enhances system performance by encoding the data field and the identifier to produce a composite parity check. Because the composite parity check contains parity bits encoded according to both the data field and the identifier, the composite parity check effectively provides vestigial identification of an interfering message without actually transmitting the identifier. As shown in FIG. 4, a message 40 transmitted in accordance with the vestigial encoding scheme of the present invention has a data field $I_d$ 42, representing voice or other information, and a parity field P 44.

Unlike the transmission scheme shown in FIG. 3 in which the transmitted message includes an identifier field $I_i$, an $I_v$ identifier field 46 is effectively "hidden" in the parity field P 44 of the transmitted message 40 via CRC encoding to provide "vestigial" identification. However, the $I_v$ field 46 is not transmitted with the message 40.

In a noisy channel case, in which an error detection scheme, such as a CRC, is employed, an identifier can be vestigially represented in the error detection code. The resulting error detection code will then flag either bit errors in the data field or the presence of a "bad" identifier. Thus, the vestigial identification scheme of the present invention could be readily used in cases in which error control, such as CRC for error detection, is used.

Vestigial identification is also particularly suitable for situations in which system performance requirements allow error detection capability for a "bad" identifier message to be worse than the error detection rate for a "good" identifier message. This is often the case because interfering calls are presented to the receiver relatively infrequently. In addition, when the receiver does not actually require the identifier code, but rather only needs to determine whether the identifier is correct, vestigial identification is desirable.

Figure 5:
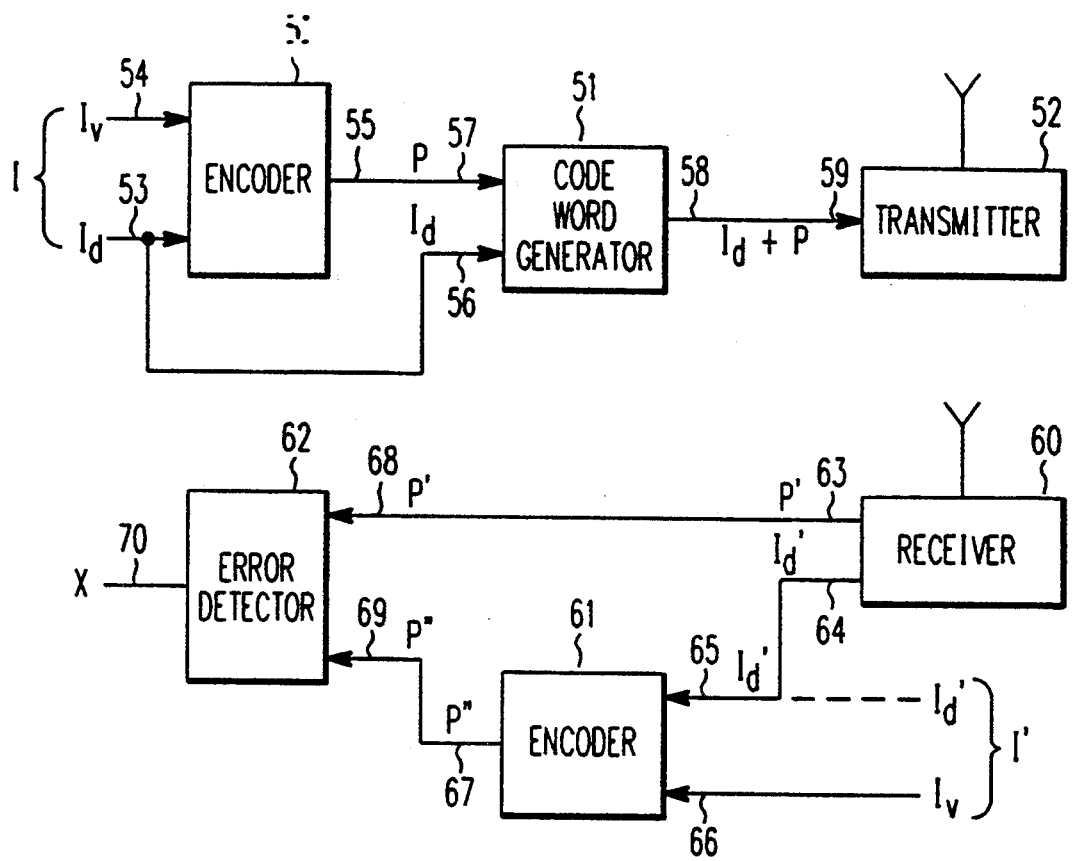
FIG. 5 is a functional block diagram illustrating the vestigial identification encoding scheme of the present invention.

A functional block diagram illustrating operation of the vestigial identification scheme is provided in FIG. 5. It is noted that the present invention may be implemented in a variety of ways apparent to one skilled in the art, such as via software or, alternatively, by hardware configured to function as described herein. As shown, a data field $I_d$, representing the information to be transmitted, and an identifier field $I_v$, indicating the source of the transmission, are presented to inputs 54 and 53, respectively, of a CRC encoder 50, as an entire information field $I = I_v + I_d$.

The encoder 50 then CRC encodes the information field I, comprising data $I_d$ and identifier $I_v$, to produce a composite parity check P at output 55. Code word generator 51 receives the composite parity check P at input 57 and combines it with the original data field $I_d$, received at input 56, to generate code word $I_d + P$ at output 58. The code word, consisting of the data field $I_d$ and the composite parity check P, is then fed to input 59 of transmitter 52 which transmits the code word to receiver 60.

The receiver 60 subsequently approximates a parity check P' and a data field $I_d'$ from the respective parity check and data portions of the transmitted code word. The approximate parity check P' is generated at output 63 for coupling to an input 68 of error detector 62, and the approximate data field $I_d'$ is made available at output 64. According to the present invention, after a call is initiated, the receiver maintains a record of the correct identifier $I_v$ for the call, indicating the source from which the message is expected to be transmitted.

To determine whether the message transmitted to receiver 60 originated from the correct transmitter, the approximated data field $I_d'$ and the recorded identifier $I_v$ are conveyed to inputs 65 and 66, respectively, of CRC encoder 61. CRC encoder 61 then encodes the approximation $I_d'$ of the received data field and the recorded identifier $I_v$, which correspond to an entire information field I', to produce a composite parity check P" at output 67. The composite parity check P" generated by CRC error encoder 61 is then provided to input 69 of error detector 62 for comparison with the parity check P' approximated from the transmitted code word. If parity check P" is not identical to P', error detector 62 generates an error output X at output terminal 70, and the transmitted code word is rejected.

The parity checks P' and P" may differ for two reasons. First, the transmitted code word may have developed bit errors during transmission. Second, the code word may have been transmitted by the wrong cell. If the code word was transmitted by the wrong cell, the composite parity check P would reflect the encoding of the data field and an incorrect identifier, and, as a result, would not be the same as a composite parity check generated on the basis of the data field and the correct identifier. In either of the above cases, the receiver will reject the code word to avoid potential call disruption.

Figure 6:
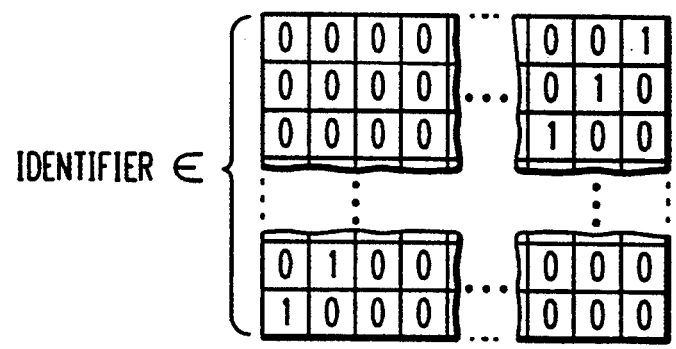
FIG. 6 is a diagram showing a variety of possible identifier states characterized by a minimum distance requirement.

An example of a collection of identifiers is shown in FIG. 6. The minimum distance property $D_{min}$ of the identifiers is important in maximizing the ability of the receiver to detect errors in the transmitted part of the code word ($I_d + P$). In the illustrated example, each of the identifiers is selected to provide a minimum distance of two bits between identifiers. If the CRC is characterized by a $D_{min} = 7$, and vestigial identification with a minimum distance of 2 is employed, the CRC will be able to detect at least $D_{min} - 2$, or 5, errors without failure.

The performance characteristics of the present invention relative to other systems can be quantified by comparing two performance parameters. The first is the parity check penetration rate, representing the rate at which messages with data errors are received without detection of the errors. The second is the identification failure rate, measuring the rate at which messages from an interfering transmitter are erroneously accepted by a receiver.

A comparison of the performance characteristics of two exemplary embodiments incorporating the vestigial identification encoding scheme relative to those of the approach shown in FIG. 3 is provided below. In one comparison, the performance of the encoding scheme illustrated in FIG. 3 is compared to an embodiment of the present invention requiring fewer transmitted bits.

The example shown in FIG. 3 requires transmission of a 32 bit message 30 containing a 5 bit identifier 32, 15 bits of data 34, and a 12 bit parity field 36. For the message of FIG. 4, the best CRC is a shortened (63, 51) Bose-Chandhuri-Hocquenghem (BCH) code with a minimum distance of 5. As an example of one embodiment of the present invention, the same BCH code is used, but without shortening it. For the present invention, the identifier $I_v$ is allowed to take on any one of 36 values identifying different cell sites, as shown in FIG. 6, and is "hidden" in the parity check P, as discussed earlier, resulting in a shortened transmitted message of only 27 bits. Because any two identifiers differ by only 2 bits, reception of a message from an interferer reduces the minimum signal space distance by at most two. Therefore, even if the wrong identifier is received, the minimum remaining signal space distance left for data error detection is 3.

A comparison of the two schemes was carried out by examining two cases. In the first case, a message from the correct transmitter was presented to the receiver. Performance was measured by the ability of the receiver to reject messages with data errors. Failures in rejecting messages with data errors are called CRC penetrations. The second case measured the ability of the receiver to reject messages presented from interfering transmitters. Failures in this case are called identifier penetrations.

In the comparison, the 27 bit embodiment of the present invention was tested by simulating 100,000 messages for the Rayleigh fading environment, using an error mask to generate bit errors. The error mask used was similar to that submitted to the Telecommunications Industry Association (TIA) for IS-54 voice transmission. This error mask represents the effects of Rayleigh fading at 30 mph at an extremely low signal-to-noise ratio of 6 dB, corresponding to a channel bit error rate (BER) of about 15%, when PI/4 shifted differential quadrature phase shift keying (QPSK) is used at 900 MHz.

When a random, but incorrect, identifier is sent, the system shown in FIG. 3 performs better than the shorter transmitted message employing the vestigial identification encoding scheme, as should be expected. In this case, identifier penetrations per 100,000 messages were 0 for the 32 bit transmitted message of FIG. 3 and 9 for the 27 bit transmitted message with vestigial identification.

Simulation results show that when the correct identifier is sent, performance of the shorter transmitted message encoding embodiment of the present invention is improved. For example, when the correct identifier was received, CRC penetrations per 100,000 messages were 8 for the 32 bit transmitted message of FIG. 3, and 11 for the 27 bit transmitted message incorporating the vestigial identifier. Thus, the shortened transmitted message example provides overall performance characteristics comparable to those of the system shown in FIG. 3.

When the system of FIG. 3 is compared to an embodiment of the present invention using the same number of bits, it is apparent that the present invention provides superior performance. As previously noted, the best CRC for the system of FIG. 3 is a shortened (63, 51) BCH code with a minimum distance of 5. In a 32 bit embodiment of the present invention, the data field $I_d$ consists of 15 data bits, and the parity field P comprises 17 bits.

According to this embodiment, the present invention employs an unshortened (63, 46) BCH code with a minimum distance of 7, and the identifier $I_v$ is allowed to take on one of 31 values. Again, because any two identifiers differ by only 2 bits, reception of a message from an interferer reduces the minimum signal space by at most 2. As a result, when the wrong identifier is received in this case, the minimum remaining signal space distance left for data error detection is 5.

Applying the same error mask used in the first example, the 32 bit embodiment of the present invention was tested by simulating 100,000 messages for the Rayleigh fading environment. For the case in which a message from an interfering transmitter was received, the number of identifier penetrations per 100,000 messages for the approach shown in FIG. 3 was 0, compared with 1 identifier penetration for the 32 bit vestigial encoding scheme of the present invention. When the correct identifier was received, the FIG. 3 technique produced 8 CRC penetrations per 100,000 messages, whereas the vestigial encoding scheme produced none.

With presently preferred embodiments of the invention having been described, additional advantages and modifications will readily occur to those skilled in the art from consideration of the specification and practice of the invention disclosed herein. It is intended that the specification and embodiments be considered as exemplary only, with the true scope and spirit of the invention being indicated by the following claims.

What is claimed is:

1. A vestigial identification system for transmitting information in a cellular communications network employing frequency reuse, said vestigial identification system comprising:
   means for generating a message including a plurality of information bits;
   means for generating an identifier including a plurality of identification bits indicating a source of said message;
   means for encoding said message and said identifier to generate a composite parity check including a plurality of parity bits;
   means for combining said message and said composite parity check to form a code word; and
   means for transmitting said code word, wherein said plurality of identification bits identify said transmitting means.

2. The vestigial identification system of claim 1, further comprising means for receiving the transmitted code word, wherein said receiving means includes error detection means for detecting errors in said transmitted code word, and for rejecting said transmitted code word in the event any errors are detected.

3. The vestigial identification system of claim 2, wherein said error detection means includes means for encoding both the message from said transmitted code word and said identifier to generate an error detection parity check, means for comparing said error detection parity check to the composite parity check from said transmitted code word, and means for indicating an error if said error detection parity check and said composite parity check are not identical to one another.

4. The vestigial identification system of claim 1, wherein said encoding means includes means for encoding said message and said identifier according to a cyclic redundancy code (CRC) to generate said composite parity check.

5. The vestigial identification system of claim 4, wherein said CRC is a Bose-Chandhuri-Hocquenghem (BCH) code.

6. The vestigial identification system of claim 5, wherein the identifier generating means includes means for generating said identifier from a set of possible identifiers, each of said possible identifiers differing by at least two bits from other possible identifiers in said set.

7. The vestigial identification system of claim 6, wherein said BCH code is selected to provide a difference of at least five bits between each possible code word and other possible code words.

8. The vestigial identification system of claim 6, wherein said BCH code is selected to provide a difference of at least seven bits between each possible code word and other possible code words.

9. A vestigial identification method for transmitting information in a cellular communications network employing frequency reuse, said vestigial identification method comprising the steps of:
   generating a message including a plurality of information bits;
   generating an identifier including a plurality of identification bits indicating a source of said message;
   encoding said message and said identifier to generate a composite parity check including a plurality of parity bits;

combining said message and said composite parity check to form a code word; and transmitting said code word, wherein said plurality of identification bits identify the source of the transmission.

10. The vestigial identification method of claim 9, further comprising the step of receiving the transmitted code word, wherein the step of receiving includes detecting errors in said transmitted code word and rejecting said transmitted code word in the event any errors are detected.

11. The vestigial identification method of claim 10, wherein the step of detecting errors includes encoding both the message from said transmitted code word and said identifier to generate an error detection parity check, comparing said error detection parity check to the composite parity check from said transmitted code word, indicating an error if said error detection parity check and said composite parity check are not identical to one another.

12. The vestigial identification method of claim 9, wherein said step of encoding includes encoding said message and said identifier according to a cyclic redundancy code (CRC) to generate said composite parity check.

13. The vestigial identification method of claim 12, wherein said CRC is a Bose-Chandhuri-Hocquenghem (BCH) code.

14. The vestigial identification method of claim 13, wherein the step of generating said identifier includes generating said identifier from a set of possible identifiers, each of said possible identifiers differing by at least two bits from other possible identifiers in said set.

15. The vestigial identification method of claim 14, wherein said BCH code is selected to provide a difference of at least five bits between each possible code word and other possible code words.

16. The vestigial identification method of claim 14, wherein said BCH code is selected to provide a difference of at least seven bits between each possible code word and other possible code words.

* * * * *